United States Patent [19]
Kanzaki et al.

[11] Patent Number: 4,975,394
[45] Date of Patent: Dec. 4, 1990

[54] SINTERED HIGH DENSITY SILICON OXNITRIDE AND METHOD FOR MAKING THE SAME

[75] Inventors: Shuzo Kanzaki; Masayoshi Ohashi; Hideyo Tabata; Osami Abe; Tooru Shimamori; Koichi Moori, all of Aichi, Japan

[73] Assignees: NGK Spark Plug Co., Ltd., Aichi; Kozo Iizuka, Director-General of Agency of Industrial Science and Technology, Tokyo, both of Japan

[21] Appl. No.: 187,131

[22] Filed: Apr. 28, 1988

[30] Foreign Application Priority Data

Apr. 28, 1987 [JP] Japan .................. 62-102998

[51] Int. Cl.$^5$ ............................ C04B 35/58
[52] U.S. Cl. ...................... 501/97; 521/98; 423/325
[58] Field of Search .............. 501/93, 98; 423/325

[56] References Cited

U.S. PATENT DOCUMENTS

Re. 28,348  2/1975  Washburn ............ 423/325
3,356,513  12/1967  Washburn ............ 501/97
4,818,733  4/1979  Shirai et al. ........... 501/97

FOREIGN PATENT DOCUMENTS 3708876   9/1983   Fed. Rep. of Germany .
3709137   10/1987  Fed. Rep. of Germany .
56-0210574 10/1985  Japan .
56-1251578 11/1986  Japan .
56-1256978 11/1986  Japan .
56-2187170 8/1987   Japan .

Primary Examiner—William R. Dixon, Jr.
Assistant Examiner—David M. Brunsman
Attorney, Agent, or Firm—Sughrue, Mion, Zinn, Macpeak & Seas

[57] ABSTRACT

A sintered silicon oxynitride composition comprises as an amount of starting material the combination of (a) a silicon component comprising silicon nitride($Si_3N_4$) and silicon oxide($SiO_2$) in a mol ratio of $SiO_2/Si_3N_4$ being 0.7 to 1.2, and (b) at least one second component selected from an aluminum oxide, an aluminum nitride, a rare earth oxide, and a rare earth nitride, said second component being in an amount of from about 0.1 to 10 mol per 100 mol of said silicon component.

4 Claims, No Drawings

SINTERED HIGH DENSITY SILICON OXNITRIDE AND METHOD FOR MAKING THE SAME

FIELD OF THE INVENTION

This invention relates to a sintered silicon oxynitride having a good high temperature strength and excellent oxidation resistance, as well as a method for making the same.

BACKGROUND OF THE INVENTION

While a sintered $Si_3N_4$ has been known as a ceramic material excellent in high temperature strength, it has a disadvantageously low oxidation resistance. On the other hand, silicon oxynitride ($Si_2N_2O$), which has been known as a compound excellent in oxidation resistance, has inferior sintering properties compared to $Si_3N_4$, and is scarcely compacted. For example, the density of a sintered silicon oxynitride, which is obtained by adding 5% by weight of $Al_2O_3$ or $Y_2O_3$ to the silicon oxynitride and sintering under a gas pressure (as described in "Sintering of Silicon Oxynitride", lecture abstract, 25th Ceramic Basic Symposium, 1987, p. 18), is only at most 2.5 g/cm$^3$, 85% of the theoretical density, resulting in insufficient strength. However as Lewis carried out when a large amount of $Al_2O_3$, $Y_2O_3$ and the like, as a sintering assistant is added (Materials Science and Engineering, Vol. 71 (1985), pp. 87–94), a compacted product is obtained but its high temperature strength and oxidation resistance are reduced. For these reasons improvements sintered silicon oxynitrides are desired.

SUMMARY OF THE INVENTION

The object of this invention is to provide a sintered compact silicon oxynitride excellent in high temperature strength.

It has now been discovered that this and other objects are attained by a sintered silicon oxynitride composition comprising as an amount of starting material the combination of (a) a silicon component comprising silicon nitride($Si_3N_4$) and silicon oxide($SiO_2$) in a mol ratio of $SiO_2/Si_3N_4$ being 0.7 to 1.2, and (b) at least one second component selected from an aluminum oxide, an aluminum nitride, a rare earth oxide, and a rare earth nitride, said second component being in an amount of from about 0.1 to 10 mol per 100 mol of said silicon component.

DETAILED DESCRIPTION OF THE INVENTION

Silicon oxynitride has good oxidation resistance and, is theoretically excellent in high temperature strength. The silicon component (hereinafter referred to as component A) and the second component (hereinafter referred to as component B) enhance the bonding strength between particles of silicon oxynitride and improve together with the particles the high temperature strength of the whole sintered body. The modulus of elasticity of sintered silicon oxynitride containing these components is smaller than those of individual sintered alumina, silicon nitride, silicium carbide or etc., the reason of which is not known. Without being bound by theory, it is considered that both $Si_3N_4$ and $SiO_2$ are unreacted components in the formation of silicon oxynitride described hereinafter. When either one or both of components A and B are contained in the sintered material the above advantages are obtained. However, when less than about 0.1% by mol, based on the total amount of silicon oxynitride, $Si_3N_4$ and $SiO_2$, of the total content of the components A and B is included, the desired effect is reduced and when the amount exceeds about 10 mol %, the strength and oxidation resistance of the component A and B as well as the glass component itself, adversely affect the sintered material, so that its strength and oxidation resistance may be lowered. Accordingly, the content of these components is preferably in the range.

Without being bound by theory, it is considered that in the process according to the present invention, $Si_3N_4$ reacts with $SiO_2$ under nitrogen gas or in a nonoxidative nitrogen gas-containing atmosphere and forms silicon oxynitride according to the following scheme (1):

$$Si_3N_4 + SiO_2 \rightarrow 2Si_2N_2O \qquad (1)$$

While both components A and B increase the rate of the formation of $Si_2N_2O$ according to scheme (1), promote the sintering and contribute the compression of the product, the amount of both components added is restricted to the range of about 0.1–10 parts, because components A and B in an amount less than about 0.1 part per 100 parts of $Si_3N_4$ and $SiO_2$ in total, are insufficient, on the other hand, more than about 10 parts is not required.

Theoretically, $SiO_2$ and $Ai_3N_4$ react each other in a ratio of 1:1 according to scheme (1). However, the mol ratio ($SiO_2/Si_3N_4$) can be from about 0.7–1.2, because the improvement expected depends on the reactivity of the powdered starting materials. Unreacted $Si_3N_4$ within about 30% and unreacted $SiO_2$ within about 20%, with respect to silicon oxynitride, do not affect adversely the oxidation resistance and high temperature strength of the sintered material.

$Si_3N_4$, $SiO_2$ and the components A and B as starting materials may be mixed together from the start of the reaction in the form of powder or may be mixed in the form of a liquid using a liquid material such as hydrated oxides, metal alkoxides etc. to form the mixture as homogeneously as possible. Subsequently, the mixture is calcined after hydrolysis to obtain a product which may be used as the starting material for the sintering process according to this invention.

The preferred embodiment within the scope of this invention are now explained in greater detail, but the present invention is not to be construed as being limited thereto.

Since the finer the powdered $Si_3N_4$ and powdered $SiO_2$, the higher the reactivity thereof, it is desired to use a pulverized starting material such as $Si_3N_4$ having a specific surface area of about 12 m$^2$/g or higher and $SiO_2$ having a specific surface area of about 60 m$^2$/g or higher.

The finer components A and B remarkably promote forming $Si_2N_2O$ and sintering of the final product, and it is desirable to use these components having a specific surface area of about 12 m$^2$/g or higher.

Since $Si_2N_2O$ is decomposed at 1600° C. or higher according to the following scheme (2), it is desirable, in order to prevent the decomposition thereof on sintering at such a high temperature, to raise the nitrogen gas pressure in the sinering atmosphere to 1 to 1,000 atms., or to sinter the molded material in a powder which generates SiO, such as powder mixtures of $SiO_2$ and $Si_3N_4$, powder mixture of $SiO_2$ and Si, SiO powder, etc.

$$3Si_2N_2O \rightarrow Si_3N_4 + 3SiO + N_2 \qquad (2)$$

According to this invention, a sintered material having a bending strength greater than 40 Kgf/mm$^2$ even at 1200° C., excellent oxidation resistance and having a low modulus of elasticity, which is highly resistant to strain, can be provided and applied to gas turbine parts, and diesel engine parts.

The present invention is hereinafter described in greater detail with reference to specific examples, which are not to be construed as limiting the scope thereof. Unless otherwise indicated, all parts, percents and ratios are by weight.

EXAMPLE 1

As starting materials, a powdered Si$_3$N$_4$ having a specific surface area of 22 m$^2$/g, a powdered SiO$_2$ having a specific surface area of 170 m$^2$/g, a powdered α-Al$_2$O$_3$ having a specific surface area of 15 m$^2$/g and a powdered γ-Al$_2$O$_3$ having a specific surface of 40 m$^2$/g were used to carry out the following steps.

Si$_3$N$_4$ and SiO$_2$ were mixed in a molar ratio (SiO$_2$/Si$_3$N$_4$) of 1, each amount of component A as shown in a Table 1 was added to 100 parts of Si$_3$N$_4$ and SiO$_2$ in total. The mixture was thoroughly mixed, granulated, and molded by hot-pressed under nitrogen gas at 300 kg/cm$^2$, at a temperature as shown in the Table 1 for 2 hrs to produce sintered silicon oxynitrides Nos. 1 to 4 shown in Table 1.

The density, modulus of elasticity, bending strength and increments in oxidation reaction of the sintered materials Nos. 1 to 4 were determined and the results are shown in Table 1 below.

The modulus of elasticity was determined by the supersonic wave pulse method, the bending strength at room temperature was determined according to JIS R1601, and the bending strengths at 1200° C. and 1300° C. were also determined according to the same method after keeping the samples at each temperature for 15 min. The increment in oxidation reaction was determined by determining the weight increments per unit surface of sintered material after keeping it at 1300° C. in the air for 100 hrs.

TABLE 1

| No. | Powder mixture SiO$_2$ [mol/mol] Si$_3$N$_4$ | Component A [mol part] | Hot press temp. [°C.] | Density of sintered material [g/cm$^3$] | Modulus of elasticity [Kgf/mm$^2$] | Bending strength [Kgf/mm$^2$] Room temp. | 1200° C. | 1300° C. | Increment in oxidation [mg/cm$^3$] | X-ray diffraction of sintered material |
|---|---|---|---|---|---|---|---|---|---|---|
| 1 | 1 | α-Al$_2$O$_3$ 2 | 1700 | 2.82 | 2.3 × 10$^4$ | 60 | 66 | 54 | 0.05 | Si$_2$N$_2$O and a minute amount of Si$_3$N$_4$ |
| 2 | 1 | α-Al$_2$O$_3$ 5 | " | 2.81 | 2.5 × 10$^4$ | 55 | 58 | 46 | 0.08 | Si$_2$N$_2$O and a minute amount of Si$_3$N$_4$ |
| 3 | 1 | γ-Al$_2$O$_3$ 2.5 | 1750 | 2.80 | 2.5 × 10$^4$ | 59 | 76 | 58 | 0.03 | Si$_2$N$_2$O and a minute amount of Si$_3$N$_4$ |
| 4 | 1 | γ-Al$_2$O$_3$ 5 | " | 2.80 | 2.5 × 10$^4$ | 71 | 48 | | 0.08 | Si$_2$N$_2$O and a minute amount of Si$_3$N$_4$ |

As seen from the Table 1, the sintered materials according to this invention had reduced deterioration in high temperature strength and were excellent in oxidation resistance, and had a modulus of elasticity as low as ca. 2.5 × 10$^4$ Kgf/mm$^2$.

EXAMPLE 2

The process of Example 1 was repeated to produce sintered materials Nos. 5–19 of silicon oxynitride, except that instead of α-Al$_2$O$_3$ and γ-Al$_2$O$_3$, a powdered Y$_2$O$_3$ having a specific surface area of 57 m$^2$/g, a powdered Sm$_2$O$_3$ having a specific surface area os 28 m$^2$/g and a powdered CeO$_2$ having a specific surface area of 36 m$^2$/g were used and hot pressed at a temperatures as shown in Table 2. The results obtained by determining the properties of these sintered materials are shown in Table 2.

TABLE 2

| No. | Powder mixture SiO$_2$ [mol/mol] Si$_3$N$_4$ | Component B | [mol part] | Hot press temp. [°C.] | Density of sintered material [g/cm$^3$] | Modulus of elasticity [Kgf/mm$^2$] | Bending strength [Kgf/mm$^2$] Room temp. | 1200° C. | 1300° C. | Increment in oxidation [mg/cm$^3$] | X-ray diffraction of sintered material |
|---|---|---|---|---|---|---|---|---|---|---|---|
| 5 | 1 | Y$_2$O$_3$ | 1 | 1800 | 2.88 | 2.5 × 10$^4$ | 62 | 69 | 60 | 0.02 | Si$_2$N$_2$O and minute amount of Si$_3$N$_4$ |
| 6 | 1 | " | 1.5 | " | 2.88 | 2.5 × 10$^4$ | 67 | 68 | 58 | 0.02 | Si$_2$N$_2$O and minute amount of Si$_3$N$_4$, Y$_2$Si$_2$O$_7$ |
| 7 | 1 | Sm$_2$O$_3$ | 0.5 | 1700 | 2.84 | 2.5 × 10$^4$ | 62 | 72 | 56 | 0.02 | Si$_2$N$_2$O and minute amount of Si$_3$N$_4$ |
| 8 | 1 | " | 1 | " | 2.88 | 2.5 × 10$^4$ | 64 | 72 | 64 | 0.02 | Si$_2$N$_2$O and minute amount of Si$_3$N$_4$ |

TABLE 2-continued

| | Powder mixture | | | Hot press temp. [°C.] | Density of sintered material [g/cm³] | Modulus of elasticity [Kgf/mm²] | Bending strength [Kgf/mm²] | | | Increment in oxidation [mg/cm³] | X-ray diffraction of sintered material |
|---|---|---|---|---|---|---|---|---|---|---|---|
| | SiO₂ [mol/mol] | Com- | | | | | | | | | |
| No. | Si₃N₄ | ponent B | [mol part] | | | | Room temp. | 1200° C. | 1300° C. | | |
| 9 | 1 | " | 0.5 | 1750 | 2.85 | $2.5 \times 10^4$ | 55 | | 65 | 0.02 | Si₂N₂O and minute amount of Si₃N₄ |
| 10 | 1 | " | 1 | " | 2.87 | $2.5 \times 10^4$ | 59 | 68 | — | 0.01 | Si₂N₂O and minute amount of Si₃N₄ |
| 11 | 1 | CeO₂ | 0.5 | 1700 | 2.85 | $2.3 \times 10^4$ | 44 | — | — | 0.02 | Si₂N₂O and minute amount of Si₃N₄ |
| 12 | 1 | " | 1 | " | 0.86 | $2.4 \times 10^4$ | 59 | 55 | 67 | 0.03 | Si₂N₂O and minute amount of Si₃N₄ |
| 13 | 1 | " | 1.5 | " | 0.85 | $2.5 \times 10^4$ | 68 | 74 | 63 | 0.02 | Si₂N₂O and minute amount of Si₃N₄ |
| 14 | 1 | " | 2 | " | 2.87 | $2.5 \times 10^4$ | 61 | 74 | 62 | 0.02 | Si₂N₂O and minute amount of Si₃N₄, Ce compound |
| 15 | 1 | " | 2.5 | " | 2.88 | $2.5 \times 10^4$ | 47 | 55 | 69 | 0.02 | Si₂N₂O and minute amount of Si₃N₄, Ce compound |
| 16 | 1 | " | 0.5 | 1750 | 2.83 | $2.5 \times 10^4$ | 67 | 80 | 79 | 0.02 | Si₂N₂O and minute amount of Si₃N₄ |
| 17 | 1 | " | 1 | " | 2.84 | $2.5 \times 10^4$ | 58 | 74 | 64 | 0.01 | Si₂N₂O and minute amount of Si₃N₄ |
| 18 | 1 | " | 1.5 | " | 2.85 | $2.4 \times 10^4$ | 57 | 72 | 58 | 0.02 | Si₂N₂O and minute amount of Si₃N₄ |
| 19 | 1 | " | 2 | " | 2.87 | $2.5 \times 10^4$ | 69 | 79 | 78 | 0.02 | Si₂N₂O and minute amount of Si₃N₄, Ce compound |

Table 2 shows that the component B has the same effect as component A.

EXAMPLE 3

A powdered Si₃N₄ having a specific surface area of 22 m²/g, a powdered SiO₂ having a specific surface area of 120 m²/g, a methanol silica sol (a colloidal silica containing 70% of methanol, manufactured by Nissan Chemicals) and a powdered CeO₂ having a specific surface area of 150 m²/g were used as starting materials and processed according to the following steps.

Si₃N₄ and either SiO₂ or the silica sol (which was reduced into SiO₂) were mixed in a molar ratio (SiO₂/Si₃N₄) of 0.8–1.5 in which the silica sol was calculated based on its SiO₂ content. The amount of component B shown in Table 3 was added to the total amount of 100 parts to prepare mixture. The mixture was thoroughly mixed, dried, granulated, and molded by a hydrostatic press at 1500 kg/cm². The molded body was then buried in a mixed powder of Si₃N₄ and SiO₂ and sintered under a pressure of nitrogen gas as shown in the Table 3 at the temperature of 1800° C. for 2 hours to produce sintered materials Nos. 20R to 27 of silicon oxynitride. The results obtained by determining the properties of these sintered materials under the same condition as in Example 1 are shown in the Table 3. The sintered materials Nos. 20R, 23R and 26R were produced as controls, and are not included in the scope of this invention.

TABLE 3

| | Powder mixture | | N₂ gas pressure at sintering | Bending strength [Kgf/mm²] | | Increment in oxidation [mg/cm³] |
|---|---|---|---|---|---|---|
| | SiO₂ [mol/mol] | Compound B | | Room | | |
| No. | Si₃N₄ | (CeO₂) [mol part] | | temp. | 1200° C. | |
| 20R | 1 | 0.05 | 9 | 10 | 12 | 0.53 |
| 21 | 1 | 2 | 9 | 49 | 55 | 0.06 |
| 22 | 1 | 7.5 | 100 | 52 | 58 | 0.06 |
| 23R | 1 | 15 | 9 | 45 | 22 | 0.24 |
| 24 | 0.8 | 2 | 9 | 47 | 54 | 0.08 |
| 25 | 1.2 | 2 | 9 | 46 | 45 | 0.06 |
| 26R | 1.5 | 2 | 9 | 28 | 31 | 0.05 |
| 27 | 1* | 2 | 9 | 55 | 53 | 0.05 |

Note
*silica sol was used.

It is considered that the sintered material No. 20R showed an insufficient density and a low strength owing to a lack of component B; that No. 23R showed deteriorated strength at a high temperature owing to an excess content of compound B; and that No. 26R also showed an insufficient density and a low strength owing to an excess amount of $SiO_2$. To the contrary, all sintered materials according to this invention showed low deterioration of strength and an excellent oxidation resistance.

While the invention has been described in detail and with reference to specific embodiments thereof, it will be apparent to one skilled in the art that various changes and modifications can be made therein without departing from the spirit and scope thereof.

What is claimed is:

1. A sintered silicon oxynitride composition comprising as an amount of starting material the combination of (a) a silicon component comprising silicon nitride($Si_3N_4$) and silicon oxide($SiO_2$) in a mol ratio of $SiO_2/Si_3N_4$ being 0.7 to 1.2, and (b) at least one second component selected from the group consisting of an aluminum oxide, an aluminum nitride, a rare earth oxide, and a rare earth nitride, said second component being present in a total amount from about 0.1 to 10 mol per 100 mol of said silicon component.

2. The silicon oxynitride composition as claimed in claim 1, wherein said rare earth oxide is selected from the group consisting of cerium oxide, yttrium oxide, and samarium oxide, and said rare earth nitride is selected from the group consisting of cerium nitride, yttrium nitride, and samarium nitride.

3. The silicon oxynitride composition as claimed in claim 1, wherein said $Si_3N_4$ comprises particles having a specific surface area of at least about 12 $m^2/g$ and said $SiO_2$ comprises particles having a specific surface area of at least about 60 $m^2/g$.

4. The silicon oxynitride composition as claimed in claim 3, wherein said second component comprises particles having a specific surface area of at last about 12 $m^2/g$.

* * * * *